United States Patent
Kodama

(10) Patent No.: US 8,421,699 B2
(45) Date of Patent: Apr. 16, 2013

(54) ANTENNA APPARATUS, RADAR AND WAVEGUIDE

(75) Inventor: Katsuhisa Kodama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 12/257,098

(22) Filed: Oct. 23, 2008

(65) Prior Publication Data

US 2009/0315796 A1    Dec. 24, 2009

(30) Foreign Application Priority Data

Jun. 18, 2008 (JP) ................................. 2008-159565

(51) Int. Cl.
*H01Q 13/00* (2006.01)
*H01P 3/00* (2006.01)

(52) U.S. Cl.
USPC ........................................... 343/772; 333/239

(58) Field of Classification Search ................... 343/772, 343/700 MS
See application file for complete search history.

(56) References Cited

U.S. PATENT DOCUMENTS

| | | | |
|---|---|---|---|
| 3,016,002 A | | 1/1962 | Frantz et al. |
| 3,831,396 A | * | 8/1974 | Donaldson et al. ............ 62/467 |
| 5,392,053 A | * | 2/1995 | Hirata et al. ............ 343/700 MS |
| 6,043,787 A | * | 3/2000 | Sanford et al. ................ 343/772 |
| 6,064,350 A | * | 5/2000 | Uchimura et al. ............ 343/786 |
| 6,295,307 B1 | * | 9/2001 | Hoden et al. .................... 372/36 |
| 6,943,735 B1 | * | 9/2005 | Cadotte, Jr. ............ 343/700 MS |

FOREIGN PATENT DOCUMENTS

| | | |
|---|---|---|
| DE | 1772040 | 12/1970 |
| DE | 2729660 A1 | 8/1978 |
| DE | 3313707 A1 | 10/1984 |
| DE | 4226428 A1 | 2/1994 |
| DE | 102006041503 A1 | 3/2008 |
| EP | 0632319 A1 | 1/1995 |
| JP | 62110268 A | 5/1987 |
| JP | 8-186401 A | 7/1996 |
| JP | 10322126 A | 12/1998 |
| JP | 2003-318641 A | 11/2003 |
| JP | 2004-15579 A | 1/2004 |
| JP | 2004-221718 A | 8/2004 |

(Continued)

OTHER PUBLICATIONS

Japanese Office Action corresponding to Japanese Patent Application No. 2008-159565, dated Feb. 19, 2010.

(Continued)

*Primary Examiner* — Jacob Y Choi
*Assistant Examiner* — Hasan Islam
(74) *Attorney, Agent, or Firm* — Sughrue Mion, PLLC

(57) ABSTRACT

An antenna apparatus can reduce gaps between laminated plates with a simple structure, and can be produced at low cost and in a small size, while ensuring reliability over a long period of time. The apparatus includes a base having a base transmission line portion, a laminated body that is composed of laminated plates placed on the base and has laminated body transmission line portions in communication with the base transmission line portion, and an antenna main body placed on the laminated body for emitting or receiving electromagnetic waves, wherein the base, the laminated plates and the antenna element plate are coupled with one another through surface to surface contact. The antenna main body has a curved plate formed of an arc-shaped elastic member protruding toward the base in a state before assembly, and the curved plate has an elastic force contributing to the coupling through surface to surface contact.

18 Claims, 11 Drawing Sheets

FOREIGN PATENT DOCUMENTS

| | | | |
|---|---|---|---|
| JP | 2005235713 | A1 | 9/2005 |
| WO | 0104993 | A1 | 1/2001 |
| WO | 2006104442 | A1 | 10/2006 |

OTHER PUBLICATIONS

Germen Office Action corresponding to German Patent Application No. 102008056705.1, dated Sep. 24, 2012.

Stocker Horst, Taschenbuch der Physik, Kapitel 6 "Mechanik Der Deformierbaren Korper" Ausgabe 5, Verlag Harry Deutsch, 2004, Abb.6.10 d, ISBN 3817117205, 9783817117208, http://www.school-scout.de/extract/24289/24289.pdf rech. Sep. 19, 2012, DE Office Action.

\* cited by examiner

ANTENNA APPARATUS, RADAR AND WAVEGUIDE

BACKGROUND OF THE INVENTION

1. Field of the Invention

The present invention relates to an antenna apparatus, a radar and a waveguide that are used in high frequency bands such as a microwave band, an extremely high frequency (EHF) or millimeter wave band, etc.

2. Description of the Related Art

In the past, there has been known an antenna apparatus which includes a laminated body that has a waveguide portion formed of a plurality of laminates or plates laminated one over another, and an antenna element plate that is placed on the laminated body and emits or receives electromagnetic waves, wherein each of the laminated plates and the antenna element plate are coupled with each other through surface to surface contact.

In this case, when the peripheral portions of the laminated plates are fastened to one another by means of fastening members such as screws, rivets or the like, there are generated gaps between the individual laminated plates by the fastening forces of the fastening members, as a result of which the following defects will occur. That is, electromagnetic waves leak from gaps of the waveguide portions which have been formed by laminating the laminates or laminated plates one over another, so not only the transmission loss is increased but also the isolation between the waveguide portions is deteriorated.

In addition, there has been a problem that an excitation phase error is generated due to the leakage of the electromagnetic waves from the gaps of the waveguide portions, thus reducing the directional characteristic of the antenna.

In order to avoid the occurrence of such problems, it is necessary to eliminate the gaps between the laminated plates as much as possible thereby to ensure the conduction or propagation of electromagnetic waves between the laminated plates.

As a means for ensuring the conduction of electromagnetic waves between the laminated plates, there are described the bonding of laminated plates by means of electroconductive rubber in a first patent document (Japanese patent application laid-open No. H8-186401), or by means of an electroconductive adhesive material in a second patent document (Japanese patent application laid-open No. 2003-318641), or by means of an adhesive sheet or adhesive material in combination with bumps in a third patent document (Japanese patent application laid-open No. 2004-15579).

Moreover, a fourth patent document (Japanese patent application laid-open No. 2004-221718) describes a means for preventing leakage of a high frequency signal, even if there are generated gaps between laminated plates, by causing a spurious short-circuit of a choke structure at nearby or adjacent portions.

However, in the case of the means using the electroconductive rubber or the electroconductive adhesive material, the leakage loss of electromagnetic waves becomes large because the electric conductivities of the electroconductive rubber and the electroconductive adhesive material are poorer than those of metals. In addition to this, there has been another problem that the adhesive strengths of the electroconductive rubber and the electroconductive adhesive material are decreased due to the aging or change over time thereof, or change of the ambient temperature, or the like. In particular, in the case of the electroconductive adhesive material, there have been a working problem, such as how to coat the adhesive material, what amount thereof is required, etc., and a material management problem such as the difficulty in storing or preserving the adhesive material.

Further, in the case of the bump structure, there have been the following problems. That is, electric conduction can not be ensured at locations other than bump portions, and when the bump structure is used in the millimeter wave band, bumps can not be formed with respect to small-sized waveguides.

Furthermore, in the case of the choke structure, this is advantageous in terms of aging and working in the temperature characteristic, but on the other hand, there have been a problem that it is necessary to ensure appropriate places in which choke grooves can be formed, at locations close to the waveguides, and hence it is difficult to reduce the size or dimensions of the entire apparatus, and a problem that the formation of fine choke grooves should be achieved at a very high cost.

SUMMARY OF THE INVENTION

Accordingly, the present invention is intended to obviate the various problems as referred to above, and a primary object of the present invention is to obtain an antenna apparatus and a radar using such an antenna apparatus which can reduce gaps between laminated plates with the use of a simple structure, and which can be produced at low cost and in a small size, and can ensure reliability over a long period of time.

Another object of the present invention is to obtain a waveguide which can reduce a gap between a base and a waveguide main body with the use of a simple structure, and which can be produced at low cost and in a small size, and can ensure reliability over a long period of time.

According to one aspect of the present invention, there is provided an antenna apparatus which includes: a base that has a base transmission line portion; a laminated body that is composed of a plurality of laminated plates placed on the base and has a laminated body transmission line portion in communication with the base transmission line portion; and an antenna main body that is placed on the laminated body and has an antenna element plate for emitting or receiving electromagnetic waves. The base, the individual laminated plates, and the antenna element plate are coupled with one another through surface to surface contact. The antenna main body has a curved plate formed of an arc-shaped elastic plate-like member that protrudes toward the base in a state before assembly thereof, and the curved plate has an elastic force that contributes to the coupling through surface to surface contact.

In another aspect of the present invention, there is provided an antenna apparatus which includes: a base that has a base waveguide portion; a laminated body that is composed of a plurality of laminated plates placed on the base and has a plurality of laminated body waveguide portions in communication with the base waveguide portion; and an antenna element plate that is placed on the laminated body and emits or receives electromagnetic waves. The base, the individual laminated plates, and the antenna element plate are coupled with one another through surface to surface contact. At least one of the laminated plates and the antenna element plate is formed of an arc-shaped elastic plate-like member that protrudes toward the base in a state before assembly thereof, and the elastic plate-like member has an elastic force that contributes to the coupling through surface to surface contact.

In a further aspect of the present invention, there is provided an antenna apparatus which includes: a base that has a base waveguide portion; a laminated body that is composed of a plurality of laminated plates placed on the base and has a plurality of laminated body waveguide portions in communication with the base waveguide portion; and an antenna element plate that is placed on the laminated body and emits or receives electromagnetic waves. The base, the individual laminated plates, and the antenna element plate are coupled with one another through surface to surface contact. At least one of the laminated plates and the antenna element plate has a plurality of elastically deformable cut and bent-up segments that protrude toward the base in a state before assembly thereof, and the cut and bent-up segments each have an elastic force that contributes to the coupling through surface to surface contact.

In a further aspect of the present invention, there is provided an antenna apparatus which includes: a base that has a base waveguide portion; a waveguide main body that is placed on the base and has a waveguide main body waveguide portion connected to the base waveguide portion; and an antenna main body that is placed on the waveguide main body and has an antenna element plate for emitting or receiving electromagnetic waves. The base, the waveguide main body, and the antenna main body are coupled with one another through surface to surface contact. At least one of the waveguide main body and the antenna main body is formed of an arc-shaped elastic member that protrudes toward the base in a state before assembly thereof, and the elastic member has an elastic force that contributes to the coupling through surface to surface contact.

In a further aspect of the present invention, there is provided a radar in which an antenna apparatus constructed according to the present invention is received in a casing.

In a further aspect of the present invention, there is provided a waveguide which includes: a base that has a base waveguide portion; a waveguide main body that is placed on the base and has a waveguide main body waveguide portion connected to the base waveguide portion; and a waveguide where the base and the waveguide main body are coupled with each other through surface to surface contact. The waveguide main body is formed of an arc-shaped elastic member that protrudes toward the base in a state before assembly thereof, and the elastic member has an elastic force that contributes to the coupling through surface to surface contact.

According to the antenna apparatuses and the radar as constructed above of the present invention, coupling of the adjacent laminated plates by the surface to surface contact thereof can be ensured, for example, by means of the elastic forces of elastic plate-like members, so the gaps between the laminated plates can be reduced by the use of a simple structure, and the antenna apparatuses and the radar can be produced at low cost and in small sizes while providing reliability over an extended period of use.

In addition, according to the waveguide as constructed above of the present invention, coupling of the base and the waveguide main body through the surface to surface contact thereof can be ensured by the elastic forces of an elastic material of which the waveguide main body is made, so the gap between the base and the waveguide main body can be reduced with the use of a simple structure, and the waveguide can be produced at low cost and in a small size, and can ensure reliability over a long period of use.

The above and other objects, features and advantages of the present invention will become more readily apparent to those skilled in the art from the following detailed description of preferred embodiments of the present invention taken in conjunction with the accompanying drawings.

DETAILED DESCRIPTION OF THE PREFERRED EMBODIMENTS

Figure 1:
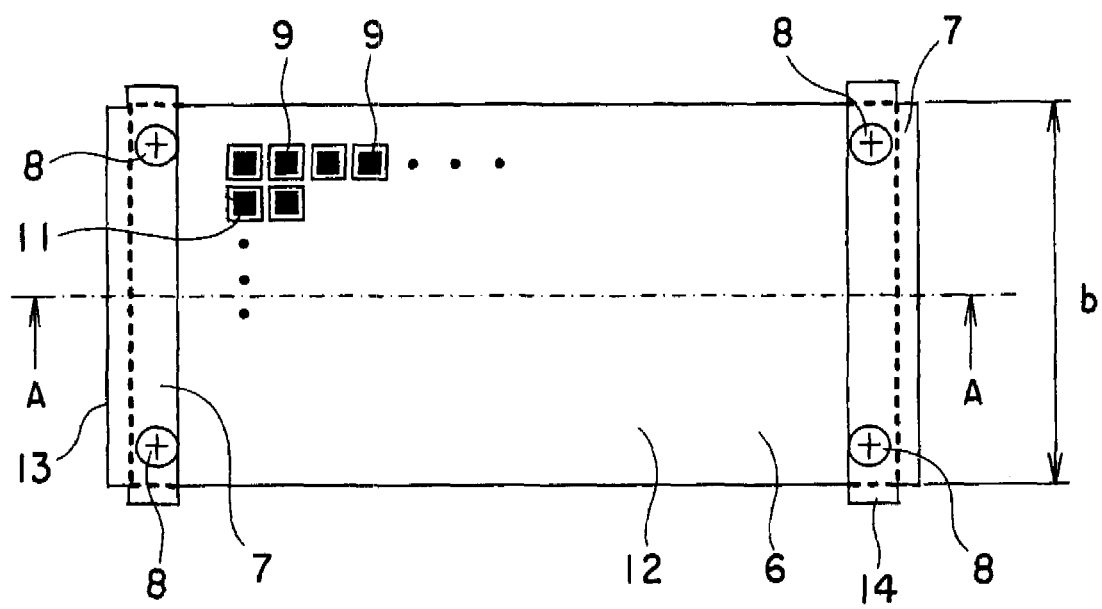
FIG. 1 is a plan view showing a patch antenna apparatus according to a first embodiment of the present invention.

Now, preferred embodiments of the present invention will be described in detail while referring to the accompanying drawings. Throughout the following embodiments and illustrated figures of the present invention, the same or corresponding members or parts are identified by the same reference numerals or the same reference characters.

Embodiment 1

Figure 2:
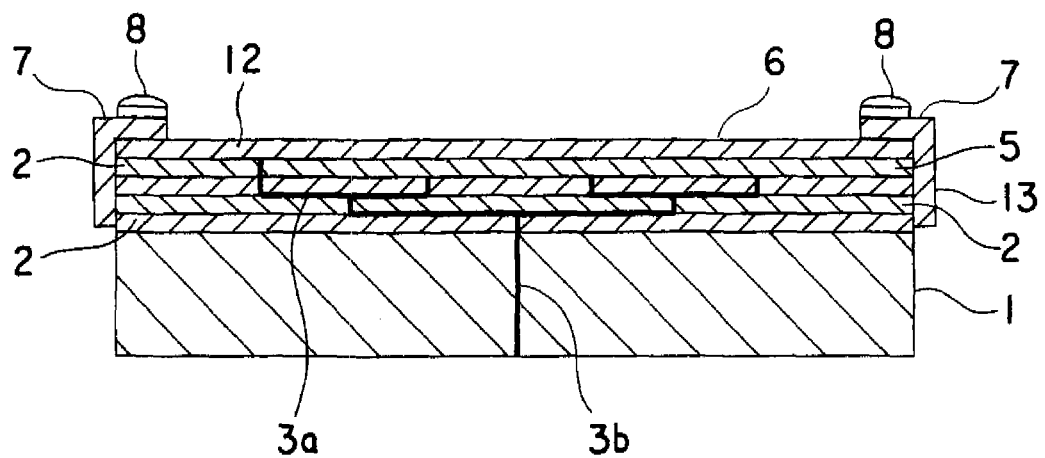
FIG. 2 is a cross sectional arrow view along line A-A of FIG. 1.
Figure 3:
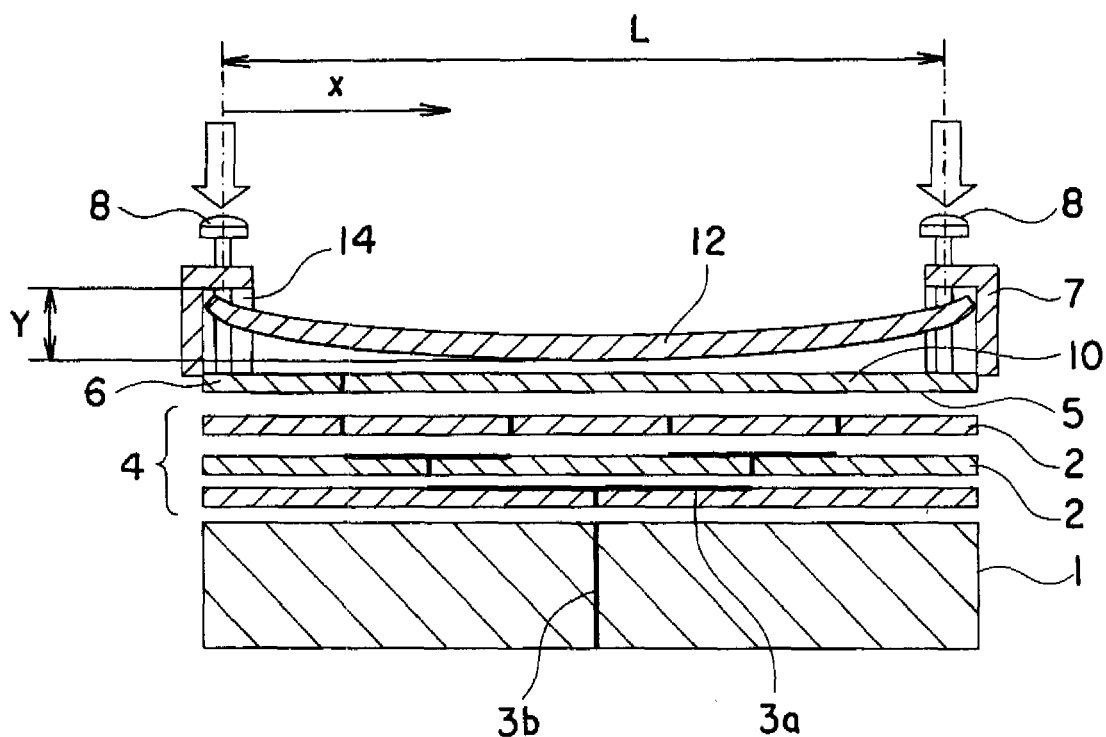
FIG. 3 is an exploded view of FIG. 2.

Referring to the drawings and first to FIG. 1, there is shown a plan view of a patch antenna apparatus according to a first embodiment of the present invention. FIG. 2 is a cross sectional arrow view along line A-A of FIG. 1, and FIG. 3 is an exploded view of FIG. 2.

This patch antenna apparatus includes a base 1 that has a base transmission line portion 3b, a laminated body 4 that is composed of a plurality of rectangular laminated plates 2 placed on the base 1 and has a plurality of laminated body transmission line portions 3a in communication with the base transmission line portion 3b, an antenna main body 5 that is placed on the laminated body 4 and serves to emit or receive electromagnetic waves, a pair of planar members 7 that each extend over an entire region between the opposite ends of the antenna main body 5 and the laminated body 4, and fastening screws 8 that are arranged at four corners of the base 1, the laminated body 4, and the antenna main body 5 and serve to couple or fasten the base 1, the laminated body 4, and the antenna main body 5 with one another. Here, note that for such fastening screws 8, there may be used other fastening members such as rivets or the like.

The antenna main body 5 includes an antenna element plate 10 that has a plurality of antenna elements 9 arranged at equal intervals, and a curved plate 12 that is formed of an arc-shaped elastic plate-like member protruding toward the base 1 in a state before assembly thereof, and has a plurality of slots 11 formed therein at locations corresponding to the antenna elements 9, respectively.

Though the rectangular curved plate 12 has a curved shape along a longitudinal direction thereof and a rectilinear or straight shape along a transverse direction thereof (i.e., in a direction normal to the longitudinal direction), it may take a curved shape along the transverse direction, and a rectilinear or straight shape along the longitudinal direction.

Each of the planar members 7 has a first bent portion 13 that is bent at one side thereof, and a second bent portion 14 that is bent in a back and forth direction, so that the opposite back and forth or longitudinal end faces and the opposite right and left or transverse end faces of the base 1, the laminated body 4, and the antenna main body 5 are positioned in place by means of these first and second bent portions 13, 14.

Each of the base 1, the laminated plates 2, the antenna element plates 6, and the curved plate 12 is made of an electroconductive material, but may instead be composed of a dielectric substrate with a thin plate of an electroconductive material attached or bonded to the outer surface of the dielectric substrate.

In the above-mentioned patch antenna apparatus, an electromagnetic wave produced in a high frequency circuit is transmitted to the antenna element plate 6 through transmission lines 3b, 3a, where it is emitted from the individual antenna elements 9 to the outside through the individual slots 11 of the curved plate 12.

Here, note that the patch antenna apparatus can receive an electromagnetic wave from the outside by the antenna elements 9.

In the patch antenna apparatus, the individual plate-like members of the individual laminated plates 2, the antenna element plate 6 and the arc-shaped curved plate 12 are placed in succession on the base 1, as shown in FIG. 3. After this, the pair of planar members 7 are forced to be placed onto the arc-shaped curved plate 12 in such a manner that the opposite end faces of the base 1, the laminated body 4 and the antenna main body 5 are caused to align with one another, and finally, the planar member 7, the base 1, the laminated body 4, and the antenna main body 5 are coupled with one another by the use of the fastening screws 8.

The elastic force of the curved plate 12, which is made of an elastic plate-like member, is increased in accordance with the increasing amount of deformation thereof, so that it contributes to increasing the coupling or binding forces of the surface to surface contact between the individual plate-like members, thereby preventing generation of a gap between the base 1 and its adjacent laminated plate 2, gaps between mutually adjacent laminated plates 2, a gap between the antenna element plate 6 and its adjacent laminated plate 2, and a gap between the antenna element plate 6 and the curved plate 12. As a result, electric conduction between the individual plate-like members is ensured.

In this embodiment of the present invention, the curved plate 12 is formed to have a curved surface by which the relation of the following expression (1) holds, so as to make the surface pressure in each contact surface be distributed in a uniform manner.

$$Y = 16 Y_{max} X (X^3 - 2LX^2 + L^3)/(5L^4) \tag{1}$$

where Y is the amount of deflection of the curved plate 12; X is the distance of a point on the curved plate 12 from a fixed point on a line connecting between the fixed point and another fixed point on the curved plate 12; Ymax is the maximum amount of deflection of the curved plate 12; and L is the distance between the two fixed points on the curved plate 12.

In addition, the curved plate 12 is in the form of a elastic plate-like member with its curved surface formed only in the longitudinal direction thereof, and hence, in order to make the surface pressure on each contact surface uniform, it is necessary make the surface pressure on the entire region of each of two sides, in a direction (i.e., transverse direction) in which the elastic plate-like member has no curved surface, equal to the above-mentioned surface pressure in the longitudinal direction.

Thus, the coupling or binding force at each side, which is generated by the use of the planar members 7, is set to a value that is obtained by the following expression (2).

$$192 E b h^3 Y_{max}/(60 L^3) \tag{2}$$

where E is the modulus of longitudinal elasticity of each planar member 7; b is the length of a straight line side of the curved plate 12; h is the thickness of each planar member 7; Ymax is the maximum amount of deflection of the curved plate 12; and L is the distance between the fixed points of the curved plate 12.

According to the patch antenna apparatus of this first embodiment, the elastic force of the curved plate 12, being in the form of the arc-shaped elastic plate-like member protruding toward the base 1 in the state before assembly thereof, serves to contribute to the coupling of the surface to surface contact of the individual plate-like members, thereby making it possible to ensure electric conduction between the individual plate-like members.

Accordingly, the patch antenna apparatus of this first embodiment serves to prevent, with a simple structure, the generation of individual gaps between the base 1 and its adjacent laminated plate 2, between mutually adjacent laminated plates 2, between the antenna element plate 6 and its adjacent laminated plate 2, and between the antenna element plate 6 and the curved plate 12, respectively, whereby it is ensured that the apparatus can be produced at low cost and in a small size, while keeping reliability over a long period of time.

Embodiment 2

Figure 4:
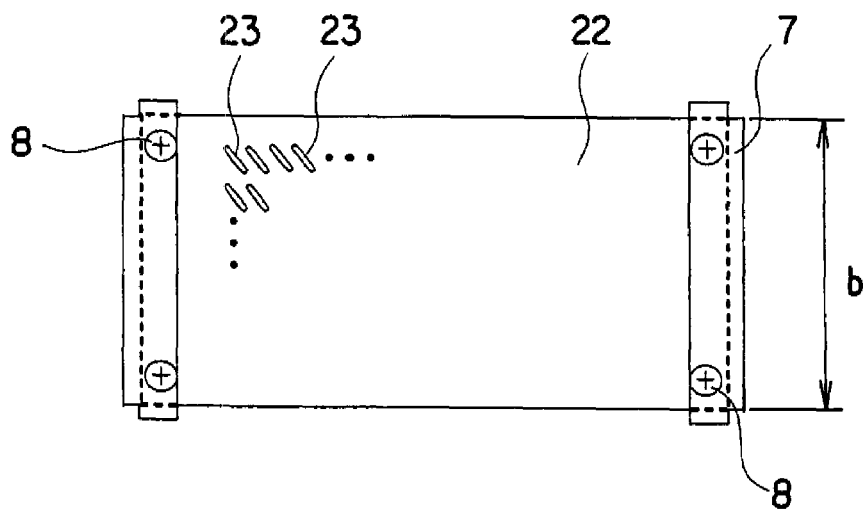
FIG. 4 is a plan view showing a slot antenna apparatus according to a second embodiment of the present invention.
Figure 5:
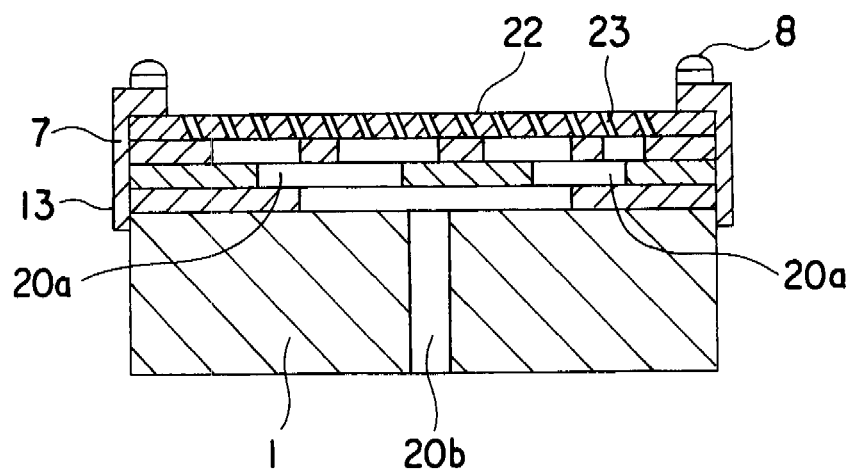
FIG. 5 is a cross sectional front view of FIG. 4.
Figure 6:
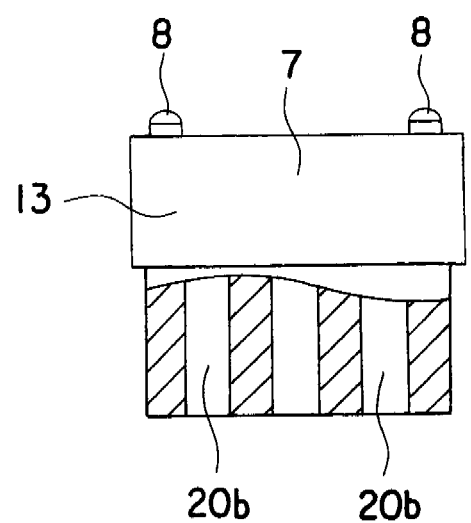
FIG. 6 is a partial cross sectional side view of FIG. 4.

FIG. 4 is a plan view that shows a slot antenna apparatus according to a second embodiment of the present invention. FIG. 5 is a cross sectional front view of FIG. 4, and FIG. 6 is a partial cross sectional side view of FIG. 4.

The slot antenna apparatus of this second embodiment includes a base 1 that has a plurality of base waveguide portions 20b formed therethrough, a laminated body 4 that is composed of a plurality of laminated plates 2 placed on the base 1 and has a plurality of laminated body waveguide portions 20a in communication with the base waveguide portions 20b, and an antenna element plate 22 that is placed on the laminated body 4 and has a plurality of slots 23 for emitting or receiving electromagnetic waves, wherein the base 1, the individual laminated plates 2, and the antenna element plate 22 are coupled with one another through surface to surface contact. The antenna element plate 22 is formed of an arc-shaped elastic plate-like member that has a curved surface formed to convex or protrude toward the base 1 along a longitudinal direction thereof in a state before assembly thereof. The construction of this second embodiment other than the above is similar to that of the aforementioned patch antenna apparatus of the first embodiment.

According to the slot antenna apparatus of this second embodiment, the antenna element plate 22 is formed of the arc-shaped elastic plate-like member, so when it is coupled or bound with the base 1 and the laminated body 4 by means of fastening screws 8, an elastic force is produced by the flexible deformation thereof. This elastic force acts to increase the coupling or binding forces of the surface to surface contact of the individual plate-like members between the antenna element plate 22 and the laminated plates 2, between the individual laminated plates 2, and between the laminated plates 2 and the base 1, whereby it is possible to prevent the generation of gaps between the individual plate-like members, thus making it possible to ensure electric conduction between the individual plate-like members.

Figure 8:
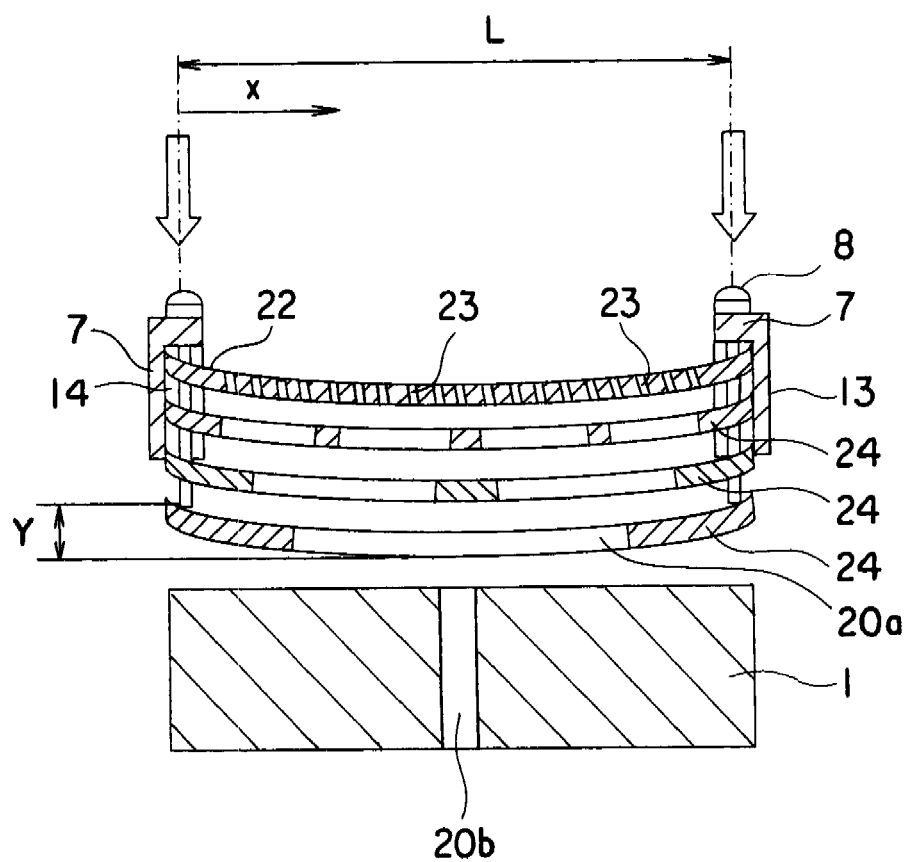
FIG. 8 is a cross sectional front view showing a modification of the slot antenna apparatus of FIG. 4.

Here, note that, as shown in FIG. 8, each laminated plate 24 can also be formed of an arc-shaped elastic plate-like member, similar to the antenna element plate 22.

In this case, elastic forces due to the flexible deformation of the individual laminated plates 24 are also added to the elastic force of the antenna element plate 22, so that the coupling or binding forces of the surface to surface contact between the individual plate-like members are accordingly increased. As a result, it is possible to prevent the generation of gaps between the individual plate-like members in a more reliable manner, and hence it is possible to ensure electrical conduction between the individual plate-like members more reliably.

In addition, the antenna element plate 22 and the laminated plates 24 are of curved shapes along the longitudinal direction thereof, and are of straight or rectilinear shapes along the transverse direction thereof, but the rectangular antenna element plate and laminated plates may instead take curved shapes along the transverse direction, and straight or rectilinear shapes along the longitudinal direction.

Moreover, only the individual laminated plates may be formed of arc-shaped elastic plate-like members, respectively.

Embodiment 3

Figure 9:
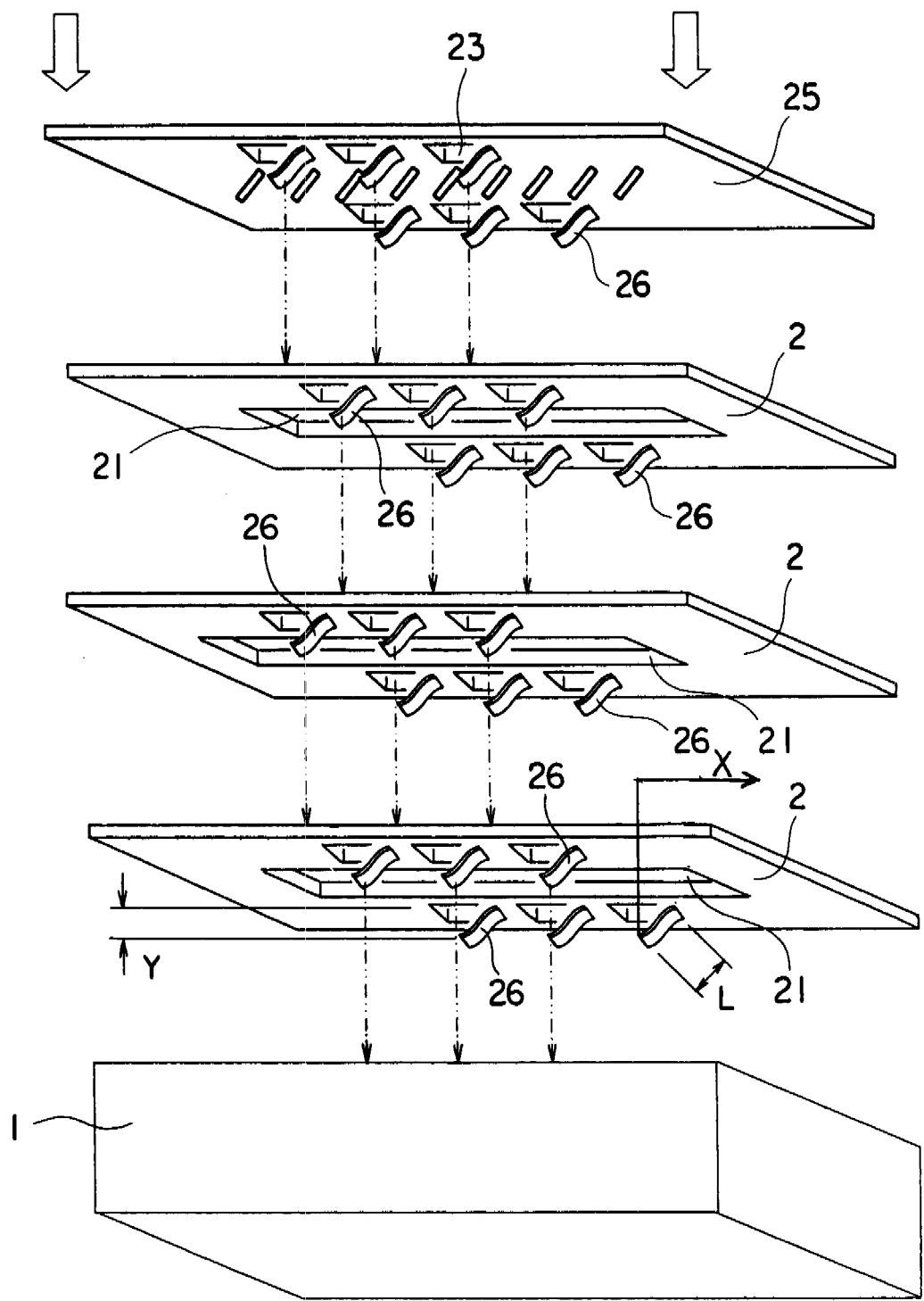
FIG. 9 is a partial exploded view showing a slot antenna apparatus according to a third embodiment of the present invention.

FIG. 9 is a partial exploded view that shows a slot antenna apparatus according to a third embodiment of the present invention.

In this embodiment, an antenna element plate 25 and individual laminated plates 2 each have a plurality of cut and bent-up segments 26 that are elastically deformable and protrude toward a base 1 in a state before assembly thereof.

In this case, when the base 1, the individual laminated plates 2, and the antenna element plate 25 are coupled with one another by means of fastening screws 8, an elastic force is produced by the flexible deformation of the cut and bent-up segments 26, and the elastic force thus produced contributes as a coupling or binding force for the surface to surface contact between the individual plate-like members of the antenna element plate 25, the individual laminated plates 2 and the base 1, whereby the generation of gaps between the individual plate-like members can be prevented, thus making it possible to ensure electric conduction between the individual plate-like members.

In this embodiment, in order to make the surface pressure on each of the contact surfaces due to the cut and bent-up segments 26 be uniformly distributed, the cut and bent-up segments 26 are each formed to have a curved surface on which the relation of the following expression (3) holds.

$$Y = Y\max(X^4 - 4XL^3 + 3L^4)/(3L^4) \quad (3)$$

where Y is the amount of deflection of a cut and bent-up segment 26; X is the distance from a base point of the cut and bent-up segment 26 in a direction along the plane or surface of a corresponding laminated plate 2; Ymax is the maximum amount of deflection of the cut and bent-up segment 26; and L is the overall length of the cut and bent-up segment 26.

According to the slot antenna apparatus of this third embodiment, there can be obtained advantageous effects similar to those of the above-mentioned slot antenna apparatus according to the second embodiment, and there is also an additional advantageous effect that the cut and bent-up segments 26 can be formed only in a region that requires contact surface pressure, so as to selectively provide the contact surface pressure to the region.

Embodiment 4

Figure 10:
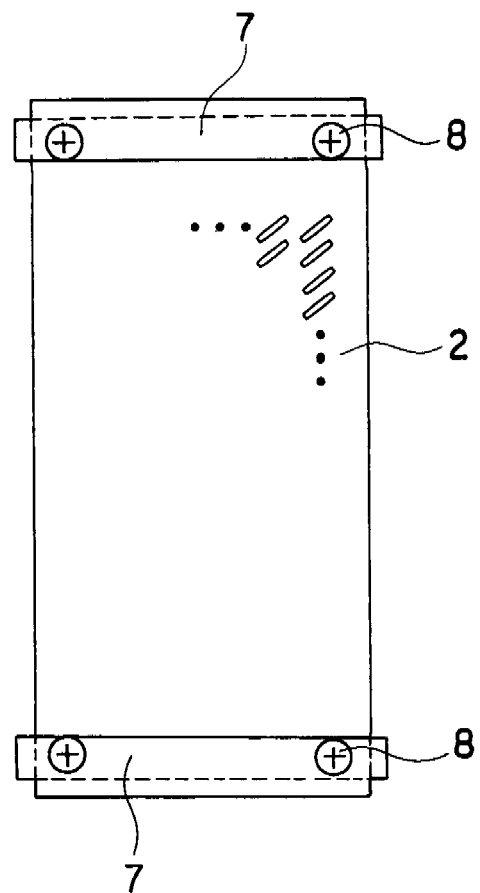
FIG. 10 is a plan view showing a slot antenna apparatus according to a fourth embodiment of the present invention.
Figure 11:
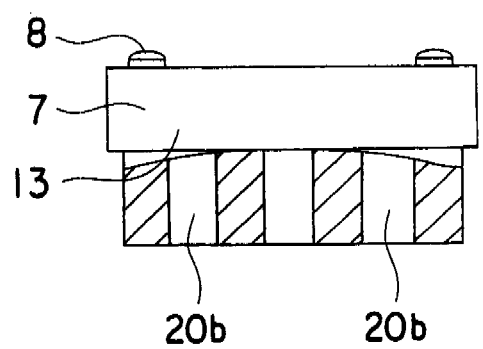
FIG. 11 is a partial cross sectional front view of FIG. 10.
Figure 12:
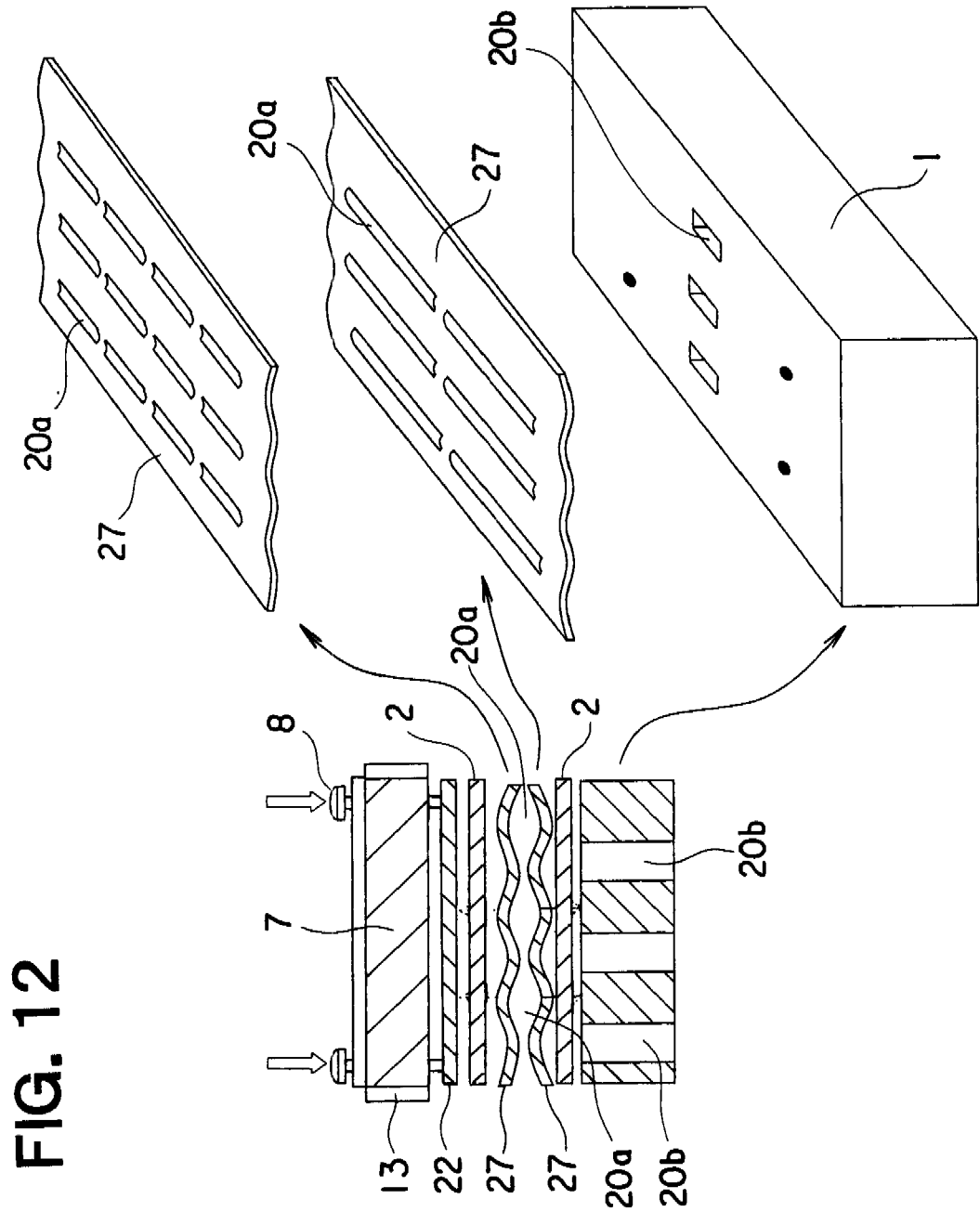
FIG. 12 is a exploded cross sectional front view of FIG. 10.

FIG. 10 is a plan view that shows a slot antenna apparatus according to a fourth embodiment of the present invention. FIG. 11 is a partial cross sectional front view of FIG. 10, and FIG. 12 is a exploded cross sectional front view of FIG. 11.

In this fourth embodiment of the present invention, a pair of rectangular intermediate-layer laminated plates 27 are arranged between a pair of laminated plates 2, and are each composed of an elastic plate-like member that takes, in a state before assembly, a wavy or corrugated shape in which a convex portion and a concave portion are repeated in an alternate manner. The laminated plates 27 are superposed with each other in such a manner that the convex portions of one of the laminated plates 27 are in abutment with the concave portions of the other laminated plate 27, with a plurality of laminated body waveguide portions 20a being formed between adjacent ones of these abutment portions.

A pair of planar members 7 are arranged at opposite short or transverse sides of the rectangular laminated plates 27, respectively. Fastening screws 8 for coupling or binding a base 1, the laminated plates 2, 27, and an antenna element plate 22 with one another are threaded with the opposite ends of the planar members 7, respectively.

The construction of this fourth embodiment other than the above is similar to that of the second embodiment.

In this case, when the base 1, the individual laminated plates 2, 27, and the antenna element plate 22 are coupled with one another by means of the fastening screws 8, an elastic force is produced by the flexible deformation of the intermediate-layer laminated plates 27, and the elastic force thus produced contributes as a coupling or binding force for the surface to surface contact between the individual plate-like members of the antenna element plate 22, the individual laminated plates 2, 27 and the base 1, whereby the generation of gaps between the individual plate-like members can be prevented, thus making it possible to ensure electric conduction between the individual plate-like members.

In addition, the laminated body waveguide portions 20a are formed between the adjacent abutment portions of the intermediate-layer laminated plates 27 at which the convex portions and the concave portions of the intermediate-layer laminated plates 27 are in abutment with each other, so it is possible to prevent electromagnetic waves from leaking between the adjacent laminated body waveguide portions 20a in a more reliable manner.

Embodiment 5

Figure 13:
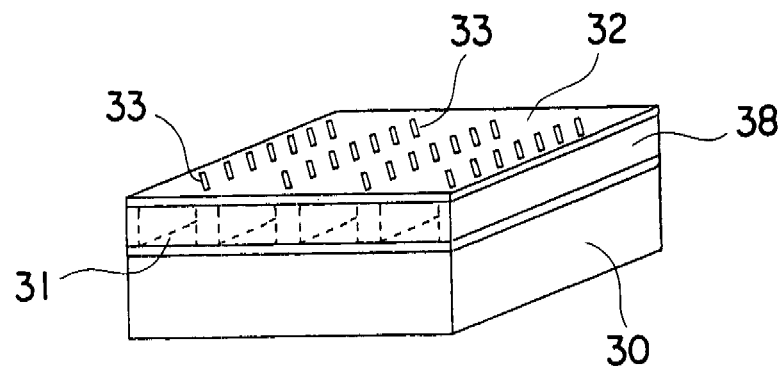
FIG. 13 is a perspective view showing a waveguide power supply antenna apparatus according to a fifth embodiment of the present invention.

FIG. 13 is a perspective view that shows a waveguide power supply antenna apparatus according to a fifth embodiment of the present invention.

This waveguide power supply antenna apparatus includes a base 30 that has a base waveguide portion (not shown), a waveguide main body 38 that is placed on the base 30 and has a plurality of waveguide main body waveguide portions 31 connected to the base waveguide portion, and an antenna main body that is placed on the waveguide main body 38 and has an antenna element plate 32 for emitting or receiving electromagnetic waves.

The antenna element plate 32 has a plurality of slots 33 formed at equal intervals. The antenna element plate 32 is formed of an arc-shaped elastic member that has a curved surface formed to convex or protrude toward the base 30 along a longitudinal direction thereof in a state before assembly thereof.

Figure 7:
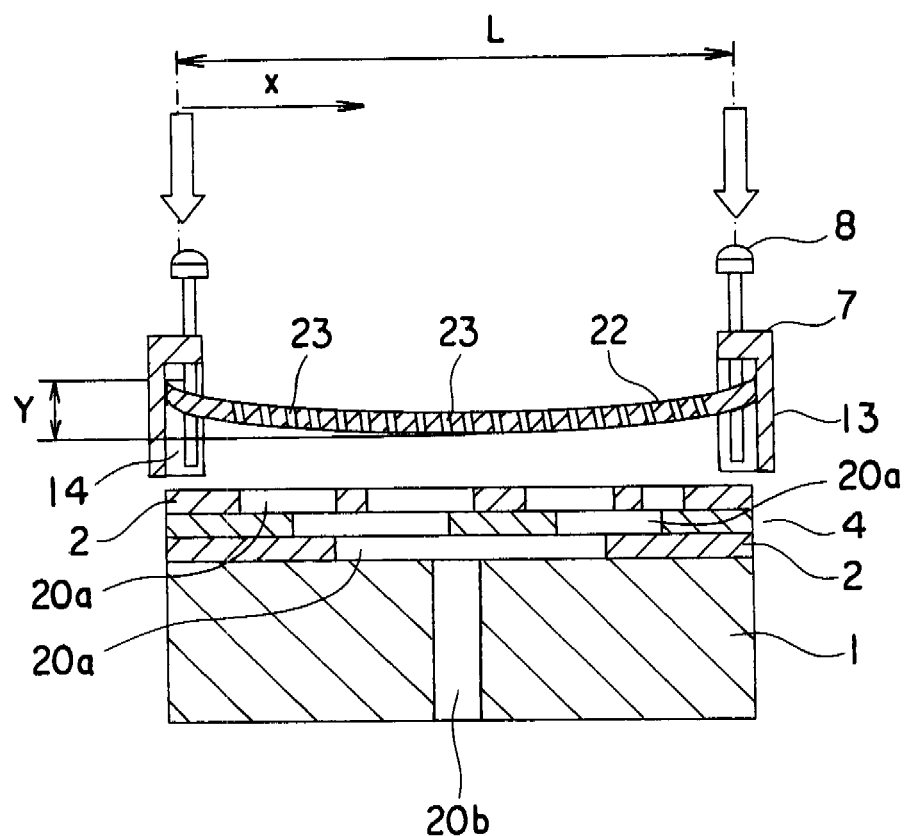
FIG. 7 is an exploded view of FIG. 5.

Though not illustrated, the base 30, the waveguide main body 36, and the antenna main body are integrally coupled or bound with one another by the use of planar members and coupling or fastening elements which are similar to the planar members 7 and the fastening screws 8, respectively, as shown in FIG. 7.

According to the waveguide power supply antenna apparatus of this fifth embodiment, the antenna element plate 32 is formed of the arc-shaped elastic plate-like member, so when the antenna element plate 32 is coupled or bound with the base 30 and the waveguide main body 38, an elastic force is produced by the flexible deformation thereof. The elastic force thus produced serves to increase the coupling or binding forces for the individual contact surfaces between the antenna element plate 32 and the waveguide main body 38, and between the waveguide main body 38 and the base 30, whereby the generation of gaps between the individual members can be prevented, thereby making it possible to ensure electrical conduction between the individual members.

Here, note that only the waveguide main body 38 or both the waveguide main body 38 and the antenna main body may each be formed of an arc-shaped elastic member that convexes or protrudes toward the base 30 in a state before assembly thereof.

In addition, the cut and bent-up segments 26 as used in the above-mentioned third embodiment may also be employed as a means for increasing the coupling or binding forces for the contact surfaces between the individual members.

Figure 14:
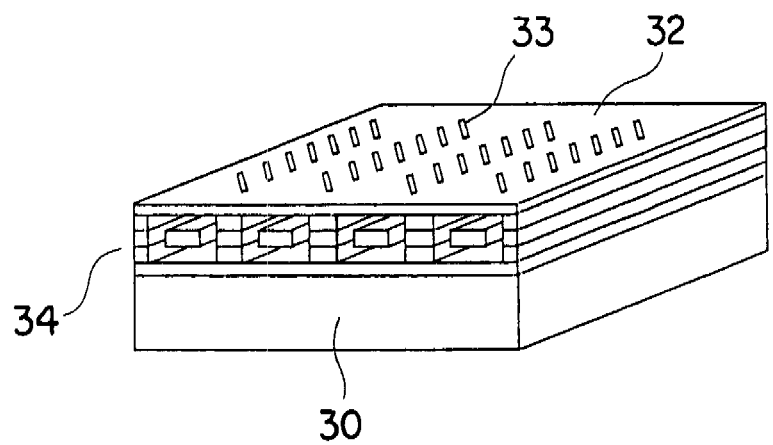
FIG. 14 is a perspective view showing a coaxial power supply antenna apparatus which is an example different from the waveguide power supply antenna apparatus of FIG. 13.

Moreover, the present invention can also be applied to a coaxial power supply antenna apparatus as shown in FIG. 14. In this case, an antenna element plate 32 placed on a coaxial line 34, which is a waveguide main body, is formed of an arc-shaped elastic plate-like member. Though not illustrated, a base 30, the coaxial line 34, and the antenna element plate 32 are integrally coupled with one another by the use of planar members and coupling or fastening elements, similar to the planar members 7 and the fastening screws 8 as shown in FIG. 7, so in this coaxial power supply antenna apparatus, too, the operation and advantageous effects similar to those in the above-mentioned waveguide power supply antenna apparatus can be obtained.

Figure 15:
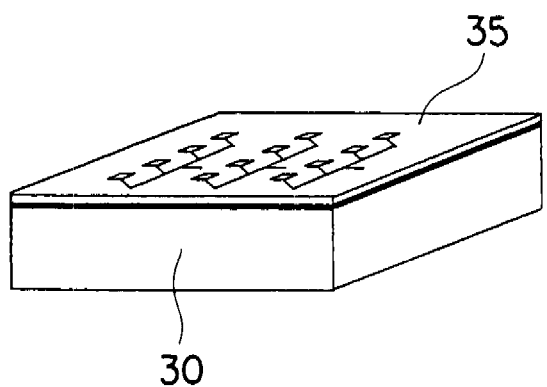
FIG. 15 is a perspective view showing a planar circuit power supply antenna apparatus which is an example different from the waveguide power supply antenna apparatus of FIG. 13.

Further, the present invention can also be applied to a planar circuit power supply antenna apparatus, as shown in FIG. 15. In this case, a waveguide main body and an antenna main body 35 for emitting and receiving electromagnetic waves are placed on a base 30. The antenna main body 35 is formed of an arc-shaped elastic plate-like member, and though not illustrated, the base 30 and the antenna main body 35 are integrally coupled or bound with each other by the use of planar members and coupling or fastening elements which are similar to the planar members 7 and the fastening screws 8, respectively, as shown in FIG. 7, so in this planar circuit power supply antenna apparatus, too, the operation and advantageous effects similar to those in the above-mentioned waveguide power supply antenna apparatus can be obtained.

Embodiment 6

Figure 16:
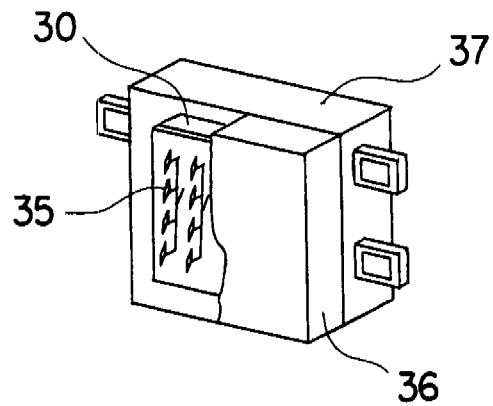
FIG. 16 is a perspective view showing a radar according to a sixth embodiment of the present invention.

FIG. 16 is a perspective view that shows a radar according to a sixth embodiment of the present invention.

This radar includes the planar circuit power supply antenna apparatus, as shown in FIG. 15, which is received in an insulating front cover 36 attached to a side surface of an electroconductive rear casing 37. Here, note that the radar can be constructed to include any of the antenna apparatuses according to the first through fifth embodiments received in the front cover 36, in place of the planar circuit power supply antenna apparatus of FIG. 15.

Embodiment 7

Figure 17:
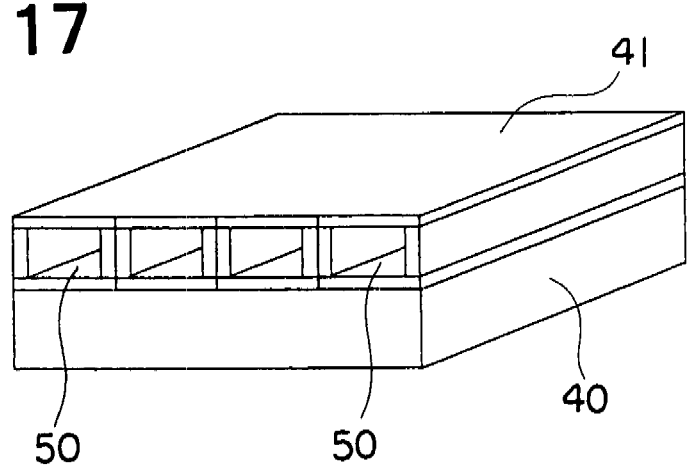
FIG. 17 is a perspective view showing a waveguide according to a seventh embodiment of the present invention.

FIG. 17 is a perspective view that shows a waveguide according to a seventh embodiment of the present invention.

The waveguide of this embodiment includes a base 40 that has a base waveguide portion (not shown), and a waveguide main body 41 that is placed on this base 40 and has a plurality of waveguide main body waveguide portions 50 in communication with the base waveguide portion, wherein the base 40 and the waveguide main body 41 are coupled with each other through surface to surface contact. This waveguide main body 41 is formed of an arc-shaped elastic member that convexes or protrudes toward the base 40 in a state before coupling thereof, and an elastic force of the elastic member contributes to the above-mentioned coupling of the base 40 and the waveguide main body 41 through the surface to surface contact.

Though not illustrated, the base 40 and the waveguide main body 41 are integrally coupled or bound with each other by the use of planar members and coupling or fastening elements which are similar to the planar members 7 and the fastening screws 8, respectively, as shown in FIG. 7.

According to the waveguide of this seventh embodiment, the waveguide main body 41 is formed of the arc-shaped elastic member, so when the waveguide main body 41 is coupled or bound with the base 40, an elastic force is produced by the flexible deformation thereof. The elastic force thus produced serves to increase the coupling or binding forces for the individual contact surfaces between the base 40 and the waveguide main body 41, whereby the generation of gaps between the individual members can be prevented, thereby making it possible to ensure electrical conduction between the individual members.

Figure 18:
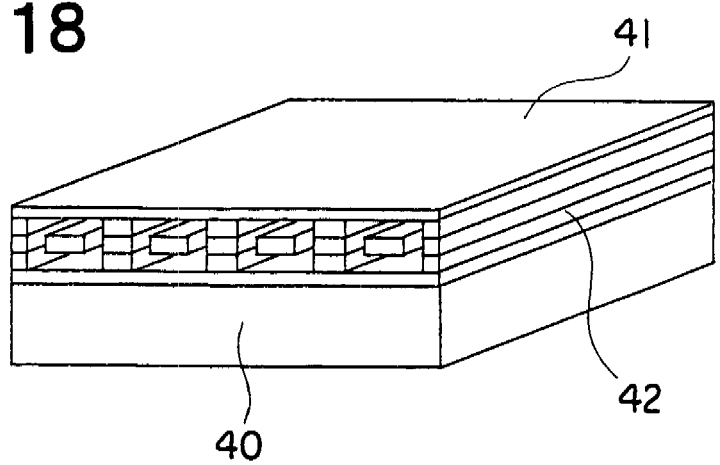
FIG. 18 is a perspective view showing a coaxial line which is an example different from the waveguide of FIG. 17.

In addition, the present invention can also be applied to a coaxial line, which acts as a waveguide, as shown in FIG. 18. In this coaxial line, a coaxial line main body 42, which is a waveguide main body, is placed on a base 40. The coaxial line main body 42 is formed of an arc-shaped elastic member that has a curved surface formed to convex or protrude toward the base 40 along a longitudinal direction thereof in a state before assembly thereof.

Though not illustrated, the base 40 and the coaxial line main body 42 are integrally coupled or bound with each other by the use of planar members and coupling or fastening elements which are similar to the planar members 7 and the fastening screws 8, respectively, as shown in FIG. 7.

In this case, the coaxial line main body 42 placed on the base 40 is formed of an arc-shaped elastic member, and the base 40 and the coaxial line main body 42 are integrally coupled with each other, so in this coaxial line, too, the operation and advantageous effects similar to those of the waveguide as shown in FIG. 17 can be obtained.

Figure 19:
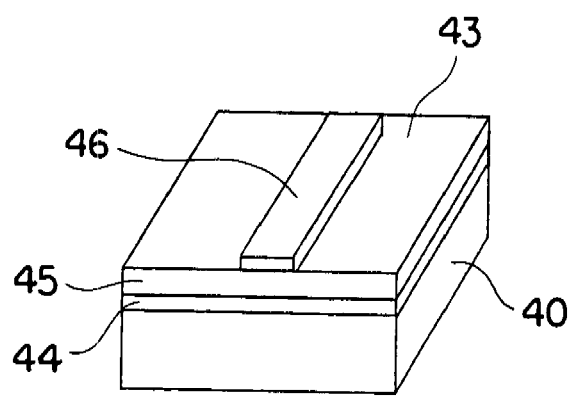
FIG. 19 is a perspective view showing a microstrip line which is an example different from the waveguide of FIG. 17.

Further, the present invention can also be applied to a microstrip line, which acts as a waveguide, as shown in FIG. 19. In this microstrip line, a line main body 43, which is a waveguide main body, is placed on a base 40. The line main body 43 is formed of an arc-shaped elastic member that has a curved surface formed to convex or protrude toward the base 40 along a longitudinal direction thereof in a state before assembly thereof. The line main body 43 includes a conductive plane 44 and an insulating plate 45 placed thereon. A conductive strip 46 is arranged on the insulating plate 45.

Though not illustrated, the base 40 and the line main body 43 are integrally coupled or bound with each other by the use of planar members and coupling or fastening elements which are similar to the planar members 7 and the fastening screws 8, respectively, as shown in FIG. 7. In this case, the line main body 43 placed on the base 40 is formed of an arc-shaped elastic member, and the base 40 and the line main body 43 are integrally coupled with each other, so in this microstrip line, too, the operation and advantageous effects similar to those of the waveguide as shown in FIG. 17 can be obtained.

Figure 20:
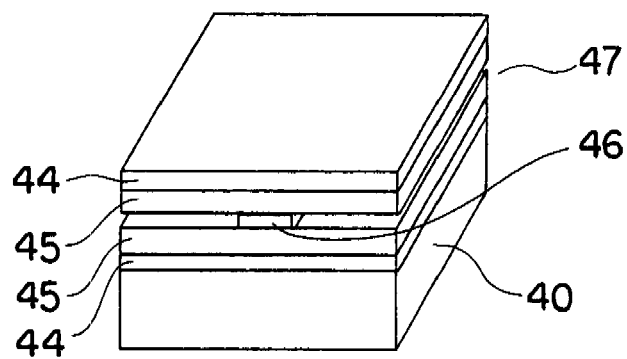
FIG. 20 is a perspective view showing a tri-plate line which is an example different from the waveguide of FIG. 17.

In addition, the present invention can also be applied to a triplate line, which acts as a waveguide, as shown in FIG. 20. In this triplate line, a line main body 47, which is a waveguide main body, is placed on a base 40. The line main body 47 is formed of an arc-shaped elastic member that has a curved surface formed to convex or protrude toward the base 40 along a longitudinal direction thereof in a state before assembly thereof. This line main body 47 includes a conductive plate 44, an insulating plate 45, a conductive strip 46, an insulating plate 45, and a conductive plate 44 which are laminated in succession.

Though not illustrated, the base 40 and the line main body 47 are integrally coupled or bound with each other by the use of planar members and coupling or fastening elements which are similar to the planar members 7 and the fastening screws 8, respectively, as shown in FIG. 7. In this case, the line main body 47 placed on the base 40 is formed of an arc-shaped elastic member, and the base 40 and the line main body 47 are integrally coupled with each other, so in this triplate line, too, the operation and advantageous effects similar to those of the waveguide as shown in FIG. 17 can be obtained.

While the invention has been described in terms of preferred embodiments, those skilled in the art will recognize that the invention can be practiced with modifications within the spirit and scope of the appended claims.

What is claimed is:

1. An antenna apparatus comprising:
    a base that has a base transmission line portion;
    a laminated body that is composed of a plurality of laminated plates placed on said base and has a laminated body transmission line portion in communication with said base transmission line portion; and
    an antenna main body that is placed on said laminated body and has an antenna element plate for emitting or receiving electromagnetic waves;
    wherein said base, said individual laminated plates, and said antenna element plate are coupled with one another through surface to surface contact; and
    said antenna main body has a curved plate formed of an arc-shaped elastic plate-like member that protrudes toward said base in a state before assembly thereof, and said curved plate has an elastic force that is increased in accordance with an increasing amount of deformation thereof and contributes to said coupling through surface to surface contact.

2. An antenna apparatus comprising:
    a base that has a base waveguide portion;
    a laminated body that is composed of a plurality of laminated plates placed on said base and has a plurality of laminated body waveguide portions in communication with said base waveguide portion; and
    an antenna element plate that is placed on said laminated body and emits or receives electromagnetic waves;
    wherein said base, said individual laminated plates, and said antenna element plate are coupled with one another through surface to surface contact; and
    at least one of said laminated plates and said antenna element plate is formed of an arc-shaped elastic plate-like member that protrudes toward said base in a state before assembly thereof, and said elastic plate-like member has an elastic force that is increased in accordance with an increasing amount of deformation thereof and contributes to said coupling through surface to surface contact.

3. An antenna apparatus comprising:
    a base that has a base waveguide portion;
    a laminated body that is composed of a plurality of laminated plates placed on said base and has a plurality of laminated body waveguide portions in communication with said base waveguide portion; and
    an antenna element plate that is placed on said laminated body and emits or receives electromagnetic waves;
    wherein said base, said individual laminated plates, and said antenna element plate are coupled with one another through surface to surface contact; and
    at least one of said laminated plates and said antenna element plate has a plurality of elastically deformable cut and bent-up segments that protrude toward said base in a state before assembly thereof, and said cut and bent-up segments each have an elastic force that is increased in accordance with an increasing amount of deformation thereof and contributes to said coupling through surface to surface contact.

4. The antenna apparatus as set forth in claim 1, wherein said elastic plate-like member of a rectangular shape has a curved shape along a longitudinal direction thereof.

5. The antenna apparatus as set forth in claim 1, wherein said elastic plate-like member of a rectangular shape has a curved shape along a transverse direction thereof.

6. The antenna apparatus as set forth in claim 2, wherein said elastic plate-like member of a rectangular shape has a corrugated shape in which a convex portion and a concave portion are repeated in an alternate manner, and a pair of said laminated plates are superposed with each other in such a manner that convex portions of one of the laminated plates are in abutment with concave portions of the other laminated plate, with said laminated body waveguide portions being formed between adjacent ones of these abutted portions.

7. The antenna apparatus as set forth in claim 4, wherein the curved surface of said elastic plate-like member is obtained by the following expression:

$$Y=16Y\max X(X^3-2LX^2+L^3)/(5L^4),$$

where Y is an amount of deflection of each of said elastic plate-like members; X is a distance of a point on said each elastic plate-like member from a fixed point on a line connecting between said fixed point and another fixed point on said each elastic plate-like member; Ymax is an maximum amount of deflection of said each elastic plate-like member; and L is a distance between both said fixed points on said each elastic plate-like member.

8. The antenna apparatus as set forth in claim 4, wherein said elastic plate-like member has its straight opposite side end portions coupled with one another over their entire regions by using planar members, respectively.

9. The antenna apparatus as set forth in claim 8, wherein each of said planar members has a coupling force that is obtained by the following expression:

$$192Ebh^3 Y\max/(60L^3),$$

where E is a modulus of longitudinal elasticity of said each planar member; b is a length of a straight side of each of said elastic plate-like members; h is a thickness of said each planar member; Ymax is an maximum amount of deflection of said each elastic plate-like member; and L is a distance between said both fixed points on said each elastic plate-like member.

10. The antenna apparatus as set forth in claim 3, wherein the curved surface of each of said cut and bent-up segments is obtained by the following expression:

$$Y = Y\max(X^4 - 4XL^3 + 3L^4)/(3L^4),$$

where Y is an amount of deflection of said each cut and bent-up segment; X is a distance from a base point of said each cut and bent-up segment in a direction along a plane of a corresponding laminated plate; Ymax is a maximum amount of deflection of said each cut and bent-up segment; L is an overall length of said each cut and bent-up segment.

11. An antenna apparatus comprising:
a base that has a base waveguide portion;
a waveguide main body that is placed on said base and has a waveguide main body waveguide portion connected to said base waveguide portion; and
an antenna main body that is placed on said waveguide main body and has an antenna element plate for emitting or receiving electromagnetic waves;
wherein said base, said waveguide main body, and said antenna main body are coupled with one another through surface to surface contact; and
at least one of said waveguide main body and said antenna main body is formed of an arc-shaped elastic member that protrudes toward said base in a state before assembly thereof, and said elastic member has an elastic force that is increased in accordance with an increasing amount of deformation thereof and contributes to said coupling through surface to surface contact.

12. A radar apparatus comprising:
an antenna apparatus as set forth in claim 1, and
a casing for receiving said antenna apparatus.

13. A waveguide comprising:
a base that has a base waveguide portion;
a waveguide main body that is placed on said base and has a waveguide main body waveguide portion connected to said base waveguide portion; and
a waveguide where said base and said waveguide main body are coupled with each other through surface to surface contact;
wherein said waveguide main body is formed of an arc-shaped elastic member that protrudes toward said base in a state before assembly thereof, and said elastic member has an elastic force that is increased in accordance with an increasing amount of deformation thereof and contributes to said coupling through surface to surface contact.

14. The antenna apparatus as recited in claim 1, wherein said arc-shaped elastic plate-like member is not a bi-metal.

15. The antenna apparatus as recited in claim 2, wherein at least one of said laminated plates and said antenna element plate is not a bi-metal.

16. The antenna apparatus as recited in claim 3, wherein said plurality of elastically deformable cut and bent-up segments are not made of a bi-metal.

17. The antenna apparatus as recited in claim 11, wherein said arc-shaped elastic member is not a bi-metal.

18. The waveguide as recited in claim 13, wherein said waveguide main body is formed of a member that is not a bi-metal.

* * * * *